(No Model.)
A. F. S. OSTERBERG.
Stock Car.
No. 238,304. Patented March 1, 1881.
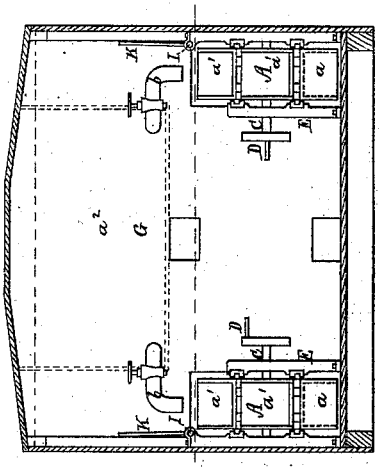
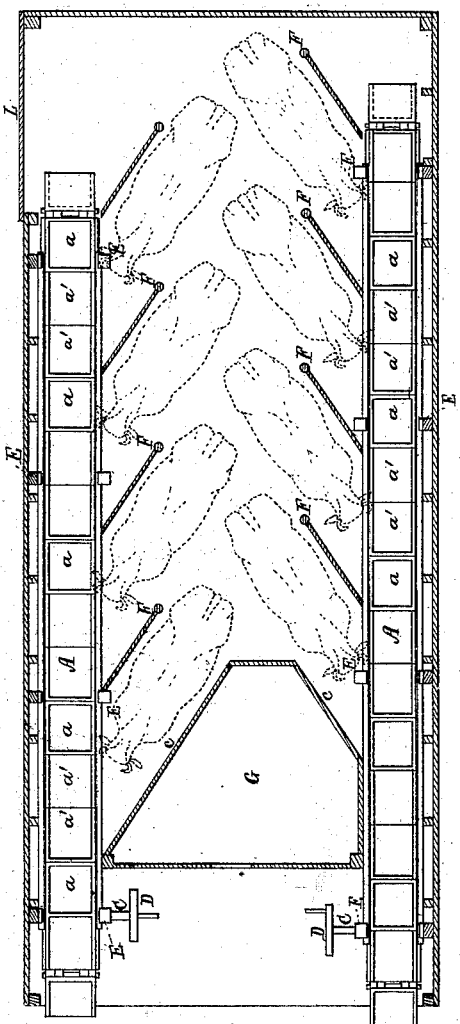
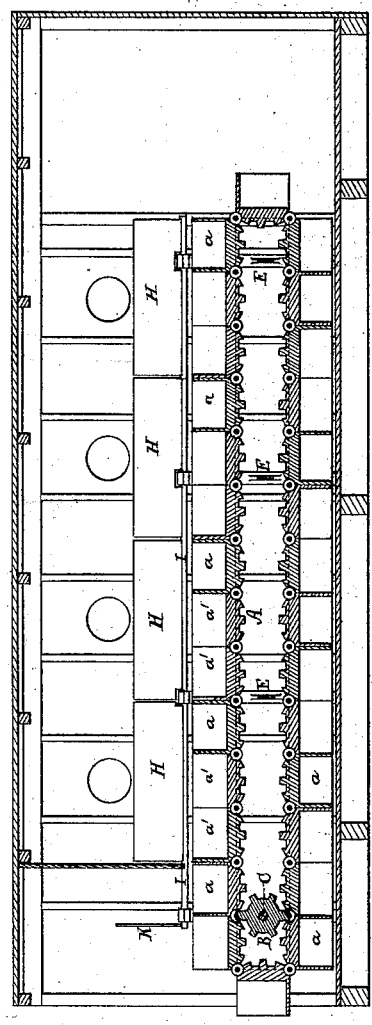
Witnesses
S. N. Piper
Inventor.
August Fredrick Samuel Osterberg.
by R. H. Ely atty.

UNITED STATES PATENT OFFICE.

AUGUST F. S. OSTERBERG, OF BOSTON, MASSACHUSETTS.

STOCK-CAR.

SPECIFICATION forming part of Letters Patent No. 238,304, dated March 1, 1881.

Application filed January 13, 1881. (No model.)

*To all whom it may concern:*

Be it known that I, AUGUST FREDRICK SAMUEL OSTERBERG, of Boston, of the county of Suffolk and State of Massachusetts, have invented a new and useful Improvement in Railway-Cars for the Transportation of Cattle; and I do hereby declare the same to be described in the following specification, and represented in the accompanying drawings, of which—

Figure 1 is a horizontal section, Fig. 2 a vertical and longitudinal section, Fig. 3 a transverse section, of a car containing my invention.

The said car is intended to be used for the transportation of live-stock, such as cattle, horses, or mules, it being provided with means of feeding the animals while it, or the train of which it may make part, may be in motion.

In carrying out my invention, I arrange within the car, and near one or each side of it, an endless bucketed chain, A, each link $a$ $a'$ of which is a bucket or trough or vessel for holding food or water. In other words, each link $a$ is a vessel for holding water, and has between it and the next link $a$ two trough-links, $a'$ $a'$, which at their next adjacent or inner ends are open, so as to open directly into each other, in order to form a single receptacle for holding hay or grain when the links are horizontal or in their higher positions. The links jointed together have teeth on their under side to engage with a gear, B, whose shaft C is provided with a crank-wheel, D. This endless chain of buckets is to be suitably guided in or by proper upright frames E extending up from the floor of the car, and there is near to each of such endless chains a series of stanchions, F, or partitions arranged to form next to each succeeding three of the buckets a stall oblique to the range of said buckets or longitudinal axis of the car.

Furthermore, there is within the car, and disposed with respect to the stalls, in manner as represented, a chamber, G, for holding the food and water, the said chamber in its upper portion, $a^2$, constituting or being provided with a tank for holding the water. From this tank a faucet, $b$, is to project over each endless chain of buckets.

To each endless chain there is a series of covers, H, which project upward from a shaft, I, duly supported in bearings and extending horizontally, and provided with a handle or lever, K, for moving it, in order to turn the covers either simultaneously down upon or upward from the buckets of the stalls, as circumstances may require. These covers are to be turned down and kept so while the food and drink receptacles are being charged; afterward such covers may be turned up, in order to allow the animals free access to the charged buckets, there being, under such circumstances, next adjacent to each stall one bucket containing water and two containing food.

By having the animals stand obliquely within the car they can be stowed to better advantage than if disposed at right angles to its sides, it being intended for them to stand in manner as represented by dotted lines in Fig. 1. For the entrance of the animals into the car, or their removal therefrom, there may be a doorway, L, in each side of the car near one end of it.

By having the stanchions or partitions arranged so as to form oblique stalls, as set forth, the animals can lie down to better advantage than when standing at right angles to the sides of the car, and, besides, when the cattle are in them they (the cattle) operate to keep each other in place, and they render it unnecessary to have ropes stretched across the entrance of the stalls.

What I claim as my invention is as follows, viz:

1. A railway-car provided with one or more endless chains of buckets or food and water receptacles, arranged as described, within the body of such car and applied thereto, so as to operate substantially in manner and for the purpose set forth.

2. The feeding and watering endless chain, having each two next adjacent food-buckets, $a'$ $a'$, open at their inner ends, so as to open into each other, as set forth, each watering-bucket being open at top only.

3. The combination of the series of covers H, and their supporting-shaft, with the car-body, and each of the bucketed endless chains therein, such covers being to operate as and for the purpose set forth.

4. A railway-car having stalls arranged obliquely to its sides, as set forth, in combination with endless bucketed feeding-chains adapted to the car at its opposite sides, all being substantially as specified.

5. A railway-car provided with the food and drink holding chamber, and with stalls or stanchions and endless bucketed feeding-chains, as and arranged substantially as set forth.

AUGUST FREDRICK SAMUEL OSTERBERG.

Witnesses:
R. H. EDDY,
E. B. PRATT.